United States Patent [19]
Smith

[11] Patent Number: 6,131,995
[45] Date of Patent: Oct. 17, 2000

[54] MULTI-FUNCTIONAL SEAT SHIELD

[76] Inventor: Dennis Smith, 2650 E. Colorado Blvd., #263, Pasadena, Calif. 91107

[21] Appl. No.: 09/361,693

[22] Filed: Jul. 27, 1999

[51] Int. Cl.[7] .................................................. A47C 27/00
[52] U.S. Cl. .......................... 297/229; 297/224; 297/118
[58] Field of Search ................ 297/DIG. 6, 118, 297/219.1, 224, 223, 229, 283.1; 5/417, 419, 420

[56] References Cited

U.S. PATENT DOCUMENTS

| | | |
|---|---|---|
| 2,696,872 | 12/1954 | Kurland et al. . |
| 4,718,721 | 1/1988 | Pompa . |
| 4,958,886 | 9/1990 | Barattini et al. . |
| 5,150,945 | 9/1992 | Aupperlee et al. . |
| 5,386,603 | 2/1995 | Drust . |
| 5,557,815 | 9/1996 | Mintz et al. . |
| 5,843,556 | 12/1998 | Levas . |
| 5,906,413 | 5/1999 | Yang . |

*Primary Examiner*—Milton Nelson, Jr.
*Attorney, Agent, or Firm*—Raymond Y. Chan; David and Raymond

[57] ABSTRACT

A multi-functional seat shield not only is adapted for protecting of a car seat by detachably covering its contact surfaces, but also can be used as an outdoor ground pad when it is not used on the seat. Therefore, when the seat shield is not in use for covering the seat, the seat shield can be turned inside out through the pocket opening so as to turn a front surface of a cover sheet and an inner surface of a pocket sheet out and invert a holding piece to store between the cover sheet and the pocket sheet. Thus, the seat shield is re-arranged to be used as a ground pad.

20 Claims, 6 Drawing Sheets

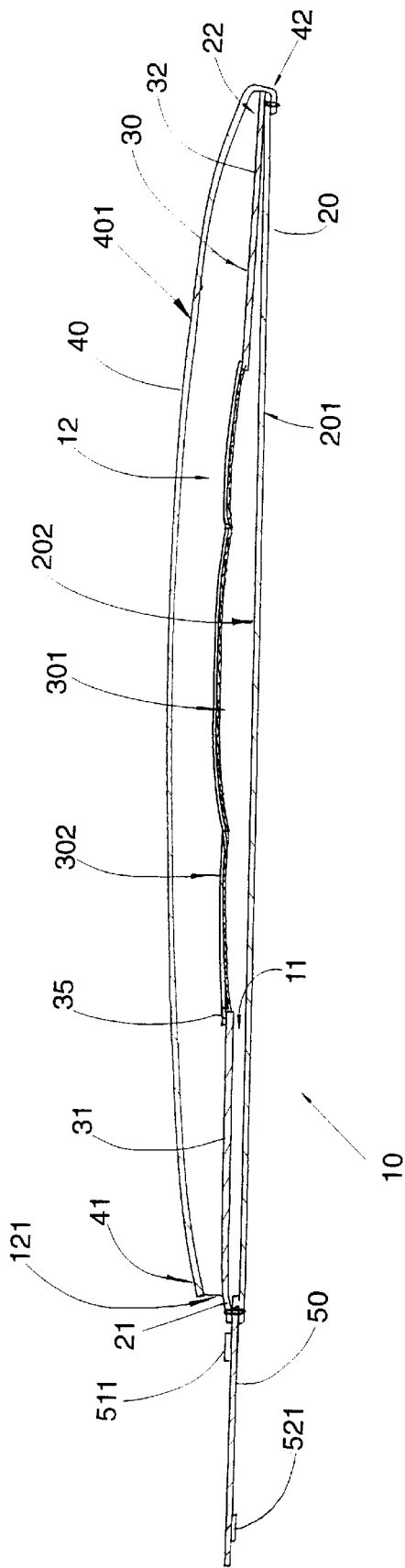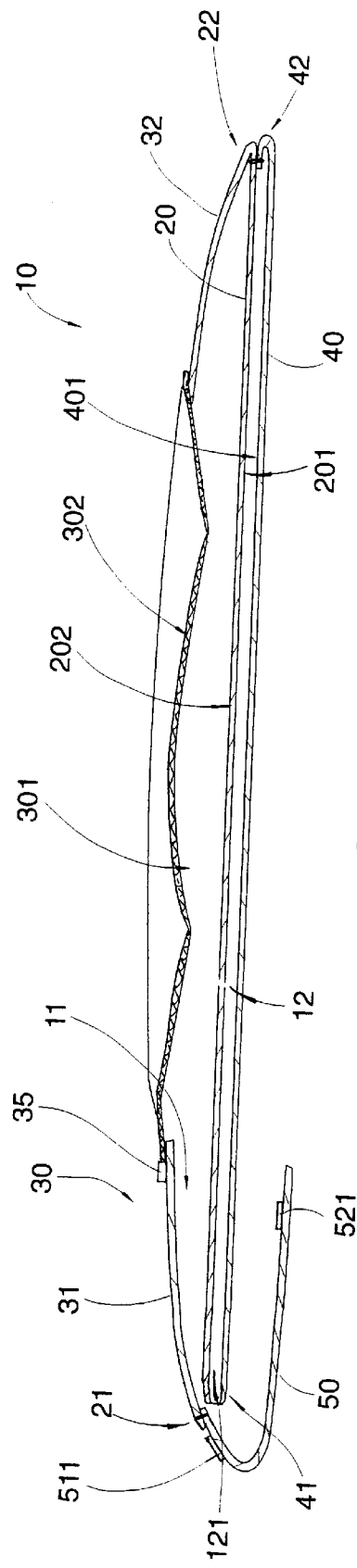
FIG 6
FIG 5

MULTI-FUNCTIONAL SEAT SHIELD

BACKGROUND OF THE PRESENT INVENTION

1. Field of Invention

The present invention relates to detachable seat cover, and more particularly to a multi-functional seat shield which not only is adapted for protecting of a car seat by detachably covering its contact surfaces, but also can be used as an outdoor ground pad.

2. Description of Related Arts

How to prevent the wet and dirty body or sportswear from polluting the expensive leather made or fabric made car seat becomes a common headache to every sporter. The body sweats will permeate into the leather or fabric of the seat and cause non-repairable damages gradually. Besides, it is very difficult and expensive to clean the stains and dirt on the seats. Therefore, all drivers would try their best to avoid getting their seats dirty.

However, there are still a lot of circumstances that may pollute the car seats. such as:

1. When a dog or a cat is required to be carried in the vehicle.
2. Your child passenger may spill on the seats.
3. Your beachwear may carry a lot of sand from the beach.
4. When you carry your sporting accessories, such as ratchets, clubs, baseball bats, golf shoes, rollerblades, gameballs, and etc., on the seats.
5. You are not allow to take a shower to clean your sweat body before driving home.
6. When you need to drive in a rainy day or snowy day.

Somebody may bring a towel or a sheet of PVC or Nylon fabric in the trunk for covering the car seat when required. It is unpractical because it is very difficult to keep the covering towel or fabric sheet to remain in position and may cause uncomfortable feeling to the driver or passengers. Moreover, the covering sheet or towel itself may get dirty before being used to cover the seat.

SUMMARY OF THE PRESENT INVENTION

Accordingly, it is a main object of the present invention to provide a multi-functional seat shield which not only is adapted for protecting of a car seat by detachably covering its contact surfaces, but also can be used as an outdoor ground pad when it is not used on the seat.

Another object of the present invention is to provide a multi-functional seat shield, wherein the surfaces for contacting with the sitting surfaces are normally folded inside a storage pocket to avoid getting dirty before used on the seat.

Another object of the present invention is to provide a multi-functional seat: shield which is easy to fold up for storage and unfold for use. Moreover, the folding up operation of the seat shield can also prevent its dirty body contacting surfaces from contacting with the sitting surface.

In order to accomplish the above objects, the present invention provides a seat shield which comprises:

a cover sheet having a head side, a tail side and two longitudinal sides extended between the head side and the tail side, the cover sheet having a front surface and a backing surface that has a size adapted to fully cover the backing surface and the sitting surface of a seat to be covered;

a holding piece overlappedly provided on the backing surface of the cover sheet, the holding piece comprising a head portion, a tail portion and two side portions inwardly extended from the head side, the tail side and the two longitudinal sides of the cover sheet respectively so as to define a holding chamber between the holding piece and the cover sheet, the holding piece having a receiving opening formed between the head portion, the tail portion and the two side portions, wherein an elastic member is affixed along a surrounding edge of the receiving opening for firmly mounting the head portion, the tail portion and the two side portions of the holding piece around the seat so as to hold the cover sheet in position to cover the backing surface and the sitting surface of the seat; and a pocket sheet being adapted for covering on the front surface of the cover sheet and having a pocket head side, a pocket tail side and two pocket longitudinal sides, wherein the pocket tail side and the two pocket longitudinal sides are respectively connected to the tail side and the two longitudinal sides of the cover sheet, so as to define a storage pocket between the front surface of the cover sheet and an inner surface of the pocket sheet, wherein a pocket opening is formed between the head side of the cover sheet and the pocket head side of the pocket sheet.

Whereby, when the seat shield is not in use for covering the seat, the seat shield can be turned inside out through the pocket opening so as to turn the front surface of the cover sheet and the inner surface of the pocket sheet out and invert the holding piece to store between the cover sheet and the pocket sheet. Thus, the seat shield is re-arranged to be used as a ground pad.

BRIEF DESCRIPTION OF THE DRAWINGS

FIG. 5 is a sectional view of the seat shield according to the above preferred embodiment of the present invention.

FIG. 6 is a sectional view of the seat shield which is inverted outside in to form a ground pad when it is not used as a seat shield according to the above preferred embodiment of the present invention.

DETAILED DESCRIPTION OF THE PREFERRED EMBODIMENT

Figure 1:
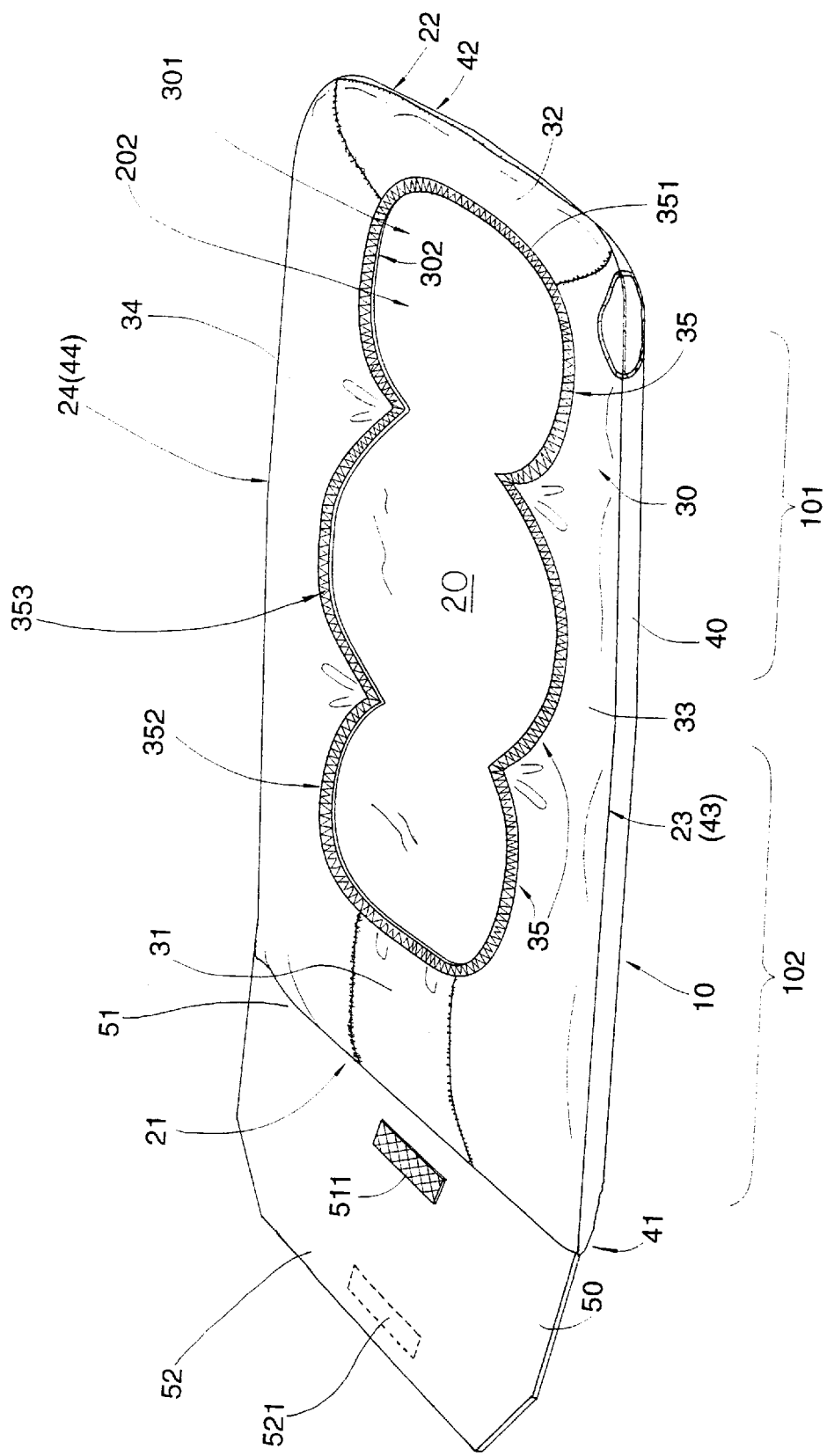
FIG. 1 is a rear perspective view of a seat shield according to a preferred embodiment of the present invention.

Referring to FIGS. 1 to 8, a multi-functional seat shield 10 according to a preferred embodiment of the present invention is illustrated, which comprises a cover sheet 20, a holding piece 30, and a pocket sheet 40.

The cover sheet 20 has a head side 21, a tail side 22 and two longitudinal sides 23, 24 extended between the head side 21 and the tail side 22. The cover sheet 20 has a front surface 201 and a backing surface 202 that has a size adapted to fully cover the backing surface and the sitting surface of a seat 60 to be covered.

Figure 3:
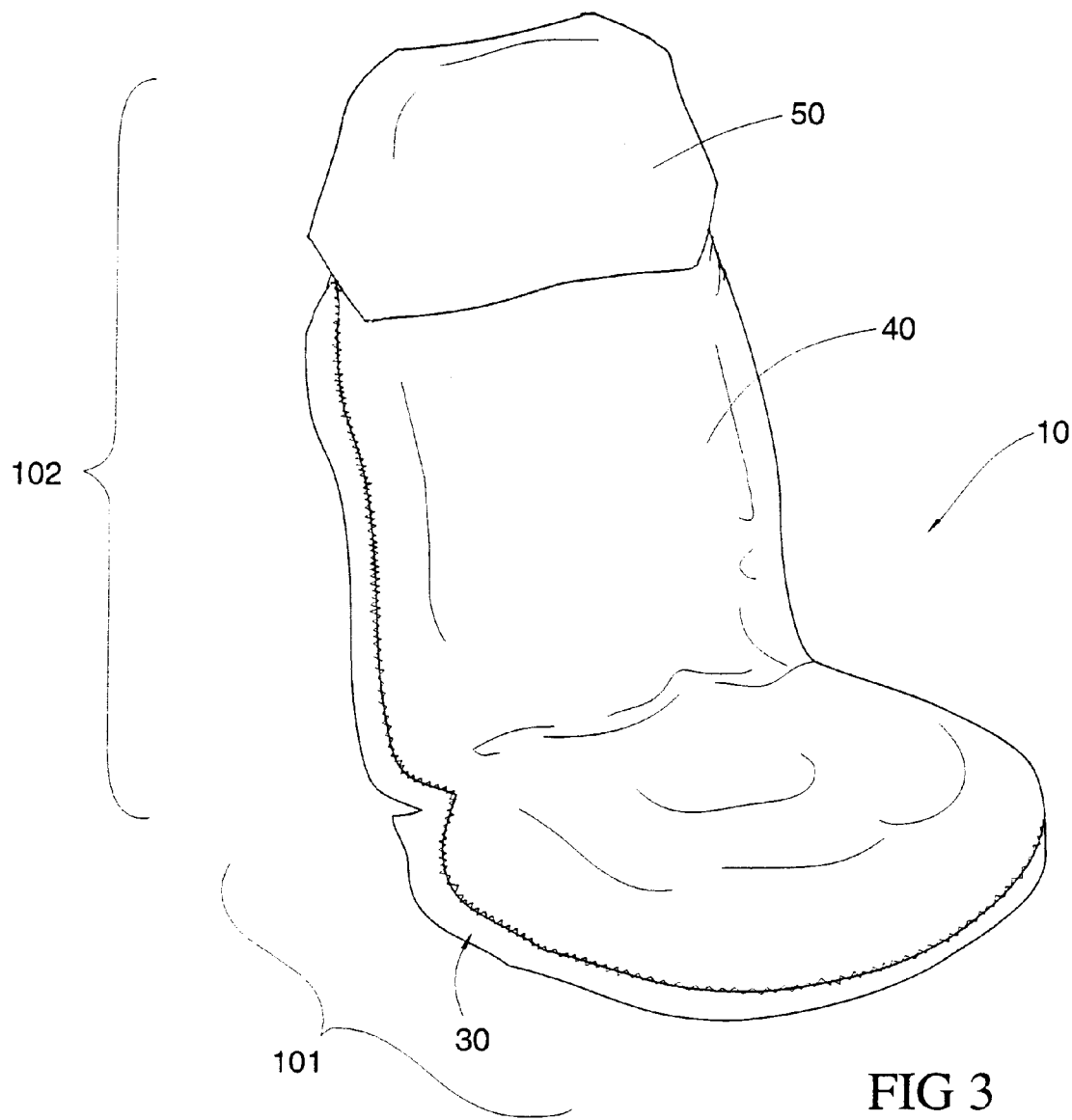
FIG. 3 is a front perspective view of the seat shield mounted on a car seat according to the above preferred embodiment of the present invention.

As shown in FIG. 1, the holding piece 30, which is overlappedly provided on the backing surface 202 of the cover sheet 20, comprises a head portion 31 a tail portion 32 and two side portions 33, 34 inwardly extended from the head side 21, the tail side 22 and the two longitudinal sides 23, 24 of the cover sheet 20 respectively so as to define a holding chamber 11 between the holding piece 30 and the cover sheet 20. The holding piece 30 has a receiving opening 301 formed between the head portion 31, the tail portion 32 and the two side portions 33, 34, wherein an elastic member 35 is affixed by double stitching along a surrounding edge 302 of the receiving opening 301 for securely mounting the head portion 31, the tail portion 32 and the two side portions 33, 34 of the holding piece 30 around the back surface 61 of the seat 60, as shown in FIGS. 3 and 4, so as to hold the cover sheet 20 in position to cover the backing surface and the sitting surface of the seat 60.

Figure 4:
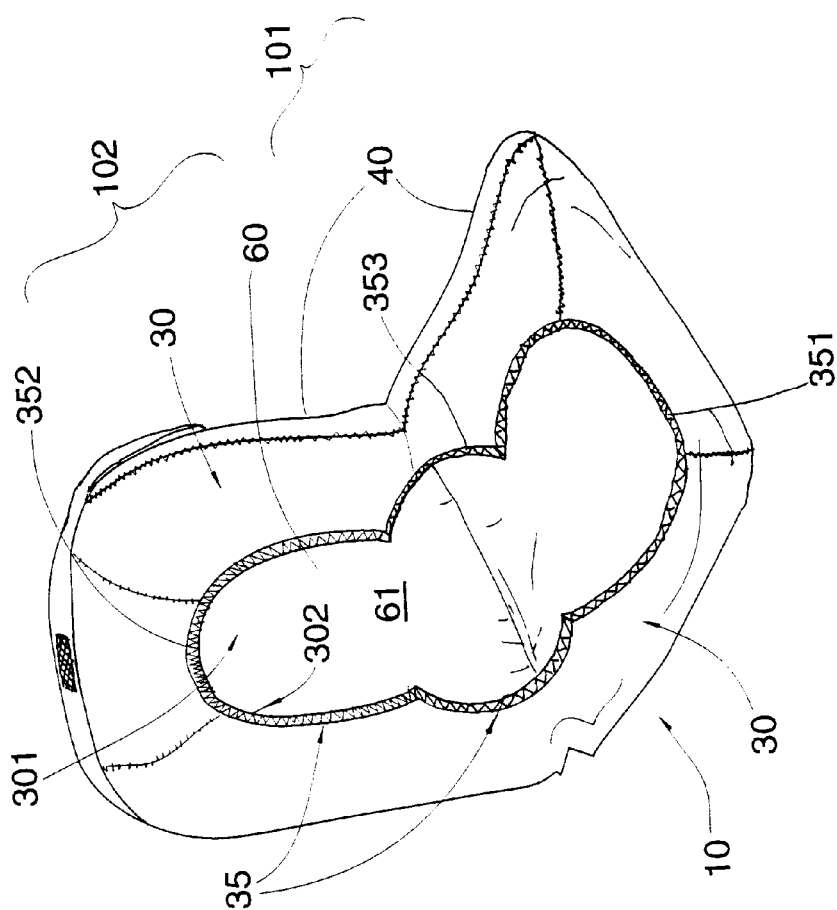
FIG. 4 is a rear perspective view of the seat shield mounted on the car seat according to the above preferred embodiment of the present invention.

As shown in FIGS. 1 and 4, the receiving opening 301 is formed in double-W shape so as to divide the elastic member 35 into a C-shaped seat section 351, a C-shaped back rest section 352 and two arc-shaped side intermediate sections 353 for holding a seat portion 101 and a back rest portion 102 of the seat shield 10 securely in place, wherein the two arc-shaped side intermediate sections 353 function for tightly holding the seat section 351 and the back rest section 352 together and securely covering the seat 60.

The cover sheet 20 and the holding piece 30 are preferred to be made of waterproof or even thermo-proof material such as Nylon fabric, Neoprene, or plastic fabric with waterproof urethane coating. Therefore, when the cover sheet 20 covers the backing surface and the sitting surface of the seat 60 and the holding piece 30 covers most of the back surface of the seat 60, the body contacting surfaces of the seat 60 is sealed and protected from directly contacting with the user's wet or dirty body and clothing.

The pocket sheet 40, which is adapted for covering on the front surface 201 of the cover sheet 20, as shown in FIGS. 1 to 4, has a pocket head side 41, a pocket tail side 42 and two pocket longitudinal sides 43, 44, as shown in FIG. 1, wherein the pocket tail side 42 and the two pocket longitudinal sides 43, 44 are respectively connected to the tail side 22 and the two longitudinal sides 23, 24 of the cover sheet 20, so as to define a storage pocket 12 between the front surface 201 of the cover sheet 20 and an inner surface 401 of the pocket sheet 40, wherein a pocket opening 121 is formed between the head side 21 of the cover sheet 20 and the pocket head side 41 of the pocket sheet 40.

Figure 8:
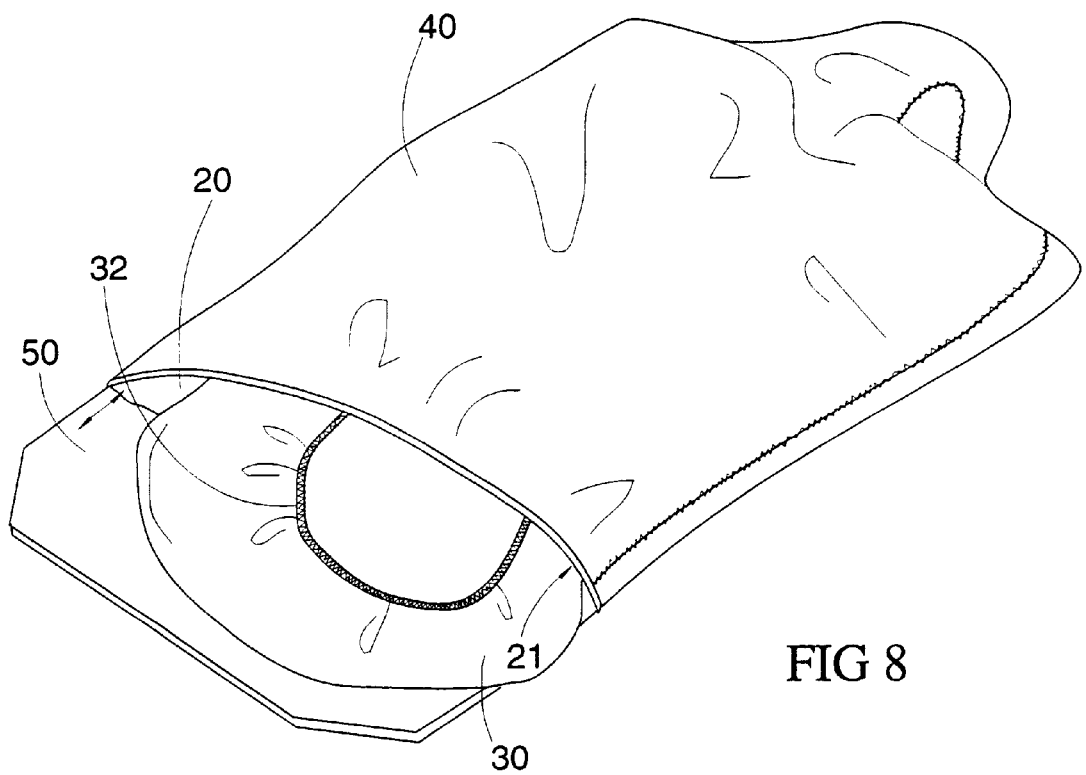
FIG. 8 is a perspective view of an inverting seat shield according to the above preferred embodiment.

As shown in FIGS. 5, 6 and 8, when the seat shield 10 is not in use for covering the seat 60, the seat shield 10 can be turned inside out through the pocket opening 121 so as to turn the front surface 201 of the cover sheet 20 and the inner surface 401 of the pocket sheet 40 out and invert the holding piece 30 to store between the cover sheet 20 and the pocket sheet 40, as illustrated in FIG. 6, and thus the seat shield 10 is re-arranged to be used as a ground pad.

Figure 2:
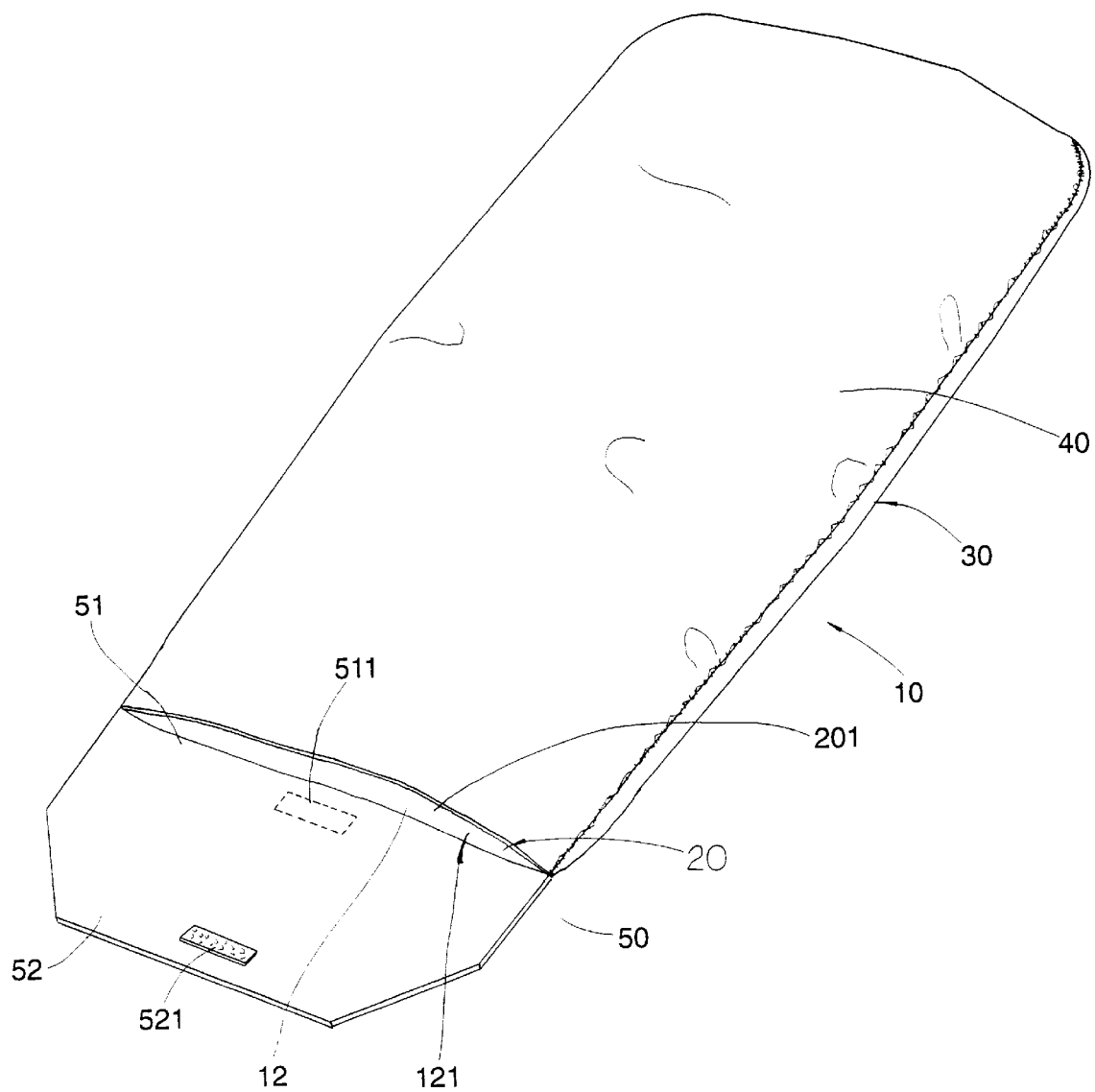
FIG. 2 is a front perspective view of the seat shield according to the above preferred embodiment of the present invention.

The pocket sheet 40 can also be made of waterproof materials as the cover sheet 20 which actually in contact with and protecting the sitting and backing surfaces of the seat 60. However, the pocket sheet 40 can also be made of other fabrics such as cotton or wool so as to provide more comfortable feeling to human body when the user sitting or lying on it. As shown in FIGS. 2 and 3, the inner layer of the cover sheet 20 behind the pocket sheet 40 provides waterproof and stainproof covering for the seat 60 so as to protect it against sweat, spills, rain, snow, sun, and sand. Besides, the outer layer of the pocket sheet 40 provides a comfortable and warm contact with the user's body. When the seat shield 10 of the present invention is functioned as a ground pad as shown in FIG. 6, the user is free to select the cooler Nylon made cover sheet 20 or the warmer cotton made pocket sheet 40 to lay on, depending on the circumference and weather.

Moreover, if the user prefers to directly sit on the Nylon fabric made cover sheet 20 for cooler feeling, as shown in FIG. 1, he or she may simply fold the holding piece 30 downwardly to cover on the pocket sheet 40.

It is worth to mention that other combination of different materials to be used for the seat shield 10 of the present invention can achieve other utility results. For example, the cover sheet 20 can be made of foam material to provide cushion effect while pocket sheet 40 is made of waterproof material to protect the seat 60 against wet and dirt.

Figure 7:
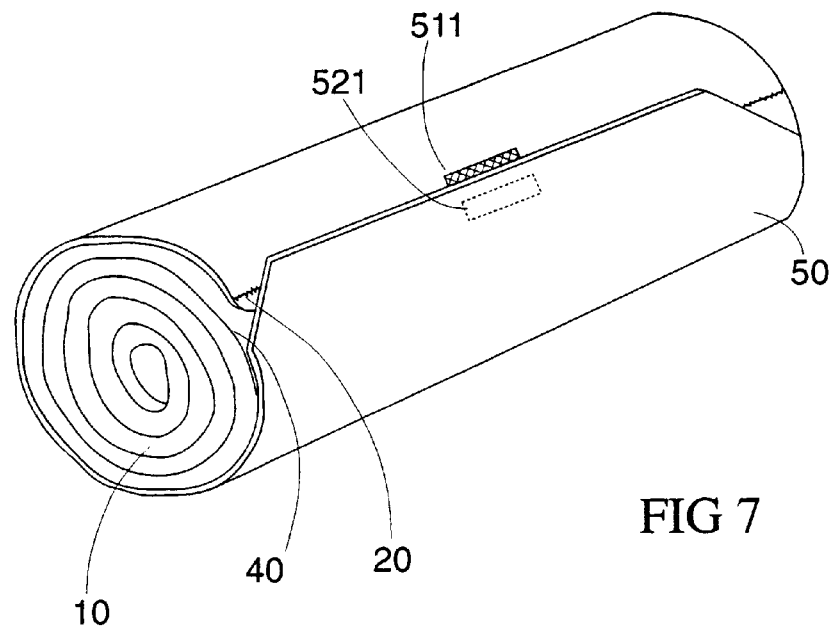
FIG. 7 is a perspective view of a folded up seat shield according to the above preferred embodiment of the present invention.

As shown in FIGS. 1 to 6, the seat shield 10 further comprises a head cover 50 which has a first side 51 connected to the head side 21 of the cover sheet 20, so that the head cover 50 can be hanged down at the top of the back rest of the seat 60 as shown in FIGS. 3 and 4. On a front surface of the head cover 50, a pad of loop fastener 511 is stitched at a central portion of the first side 51 of the head cover 50. On a rear surface of the head cover, a pad of hook fastener 521 is stitched at a central portion of the second side 52 of the head cover 50. Therefore, the head cover 50 can perform an additional function of packing the seat shield 10 in roll form, as shown in FIG. 7, wherein the seat shield 10 is rolled up from the tail end to the head end until the head cover 50 rolls up to cover the seat shield 10. Then, the hook fastener 521 can be fastened with the loop fastener 511 to secure the packing in place.

In view of above, the seat shield 10 of the present invention is a multi-functional covering means for car seat that not only is adapted for protecting of a car seat by detachably covering its contact surfaces, but also can be used as an outdoor ground pad when it is not used on the seat. Also, the surfaces for contacting with the sitting surfaces are normally folded inside a storage pocket to avoid getting dirty before used on the seat. Moreover, the seat shield is easy to fold up for storage and unfold for use, wherein the folding up operation of the seat shield can also prevent its dirty body contacting surfaces from contacting with the sitting surface.

What is claimed is:

1. A seat shield, comprising:
 a cover sheet having a head side, a tail side and two longitudinal sides extended between said head side and said tail side, said cover sheet having a front surface and a backing surface that has a size adapted to fully cover a backing surface and a sitting surface of a seat to be covered;
 a holding piece overlappedly provided on said backing surface of said cover sheet, said holding piece comprising a head portion, a tail portion and two side portions inwardly extended from said head side, said tail side and said two longitudinal sides of said cover sheet respectively so as to define a holding chamber between said holding piece and said cover sheet, said holding piece having a receiving opening formed between said head portion, said tail portion and said two side portions, wherein an elastic member is affixed along a surrounding edge of said receiving opening for firmly mounting said head portion, said tail portion and said two side portions of said holding piece around said seat so as to hold said cover sheet in position to cover said backing surface and said sitting surface of said seat; and a pocket sheet being adapted for covering on said front surface of said cover sheet by connecting to said cover sheet side to side to define a storage pocket between said front surface of said cover sheet and an inner surface of said pocket sheet, wherein said storage pocket having a pocket opening;

whereby, when said seat shield is not in use for covering said seat, said seat shield can be turned inside out through said pocket opening so as to turn said front surface of said cover sheet and said inner surface of said pocket sheet out and invert said holding piece to store between said cover sheet and said pocket sheet, and thus said seat shield is re-arranged to be used as a ground pad.

2. The seat shield as recited in claim 1 wherein said pocket sheet is made of waterproof materials.

3. The seat shield as recited in claim 2 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

4. The seat shield as recited in claim 1 wherein said pocket sheet has a pocket head side, a pocket tail side and two pocket longitudinal sides, and said pocket tail side and said two pocket longitudinal sides are respectively connected to said tail side and said two longitudinal sides of said cover sheet, so as to form said storage pocket between said front surface of said cover sheet and an inner surface of said pocket sheet, wherein said pocket opening is formed between said head side of said cover sheet and said pocket head side of said pocket sheet.

5. The seat shield as recited in claim 4 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

6. The seat shield as recited in claim 4 wherein said cover sheet and said holding piece are made of waterproof material.

7. The seat shield as recited in claim 6 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

8. The seat shield as recited in claim 6 wherein said cover sheet and said holding piece are made of Nylon fabric with waterproof urethane coating.

9. The seat shield as recited in claim 8 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

10. The seat shield as recited in claim 6 wherein said pocket sheet is made of waterproof materials.

11. The seat shield as recited in claim 10 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

12. The seat shield as recited in claim 1 wherein said cover sheet and said holding piece are made of waterproof material.

13. The seat shield as recited in claim 12 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

14. The seat shield as recited in claim 12 wherein said pocket sheet is made of waterproof materials.

15. The seat shield as recited in claim 14 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

16. The seat shield as recited in claim 12 wherein said cover sheet and said holding piece are made of Nylon fabric with waterproof urethane coating.

17. The seat shield as recited in claim 16 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

18. The seat shield as recited in claim 1 wherein said cover sheet is made of foam material to provide cushion effect and said pocket sheet is made of waterproof material.

19. The seat shield as recited in claim 18 further comprising a head cover which has a first side connected to said head side of said cover sheet, wherein on a front surface of said head cover, a pad of loop fastener is stitched at a central of said first side of said head cover, and on a rear surface of said head cover, a pad of hook fastener is stitched at a central of a second side of said head cover, so as to enable said head cover performing an additional function of packing said seat shield in roll form by making said seat shield to roll up from a tail end to a head end thereof until said head cover rolls up to cover said seat shield, and then said hook fastener is capable of fastening with said loop fastener to secure in place.

20. The seat shield as recited in claim 1 further comprising a head cover which has a first side connected to said head side of said cover sheet, wherein on a front surface of said head cover, a pad of loop fastener is stitched at a central portion of said first side of said head cover, and on a rear surface of said head cover, a pad of hook fastener is stitched at a central portion of a second side of said head cover, wherein when said seat shield is not in use, said seat shield is capable of rolling up from a tail end to a head end thereof until said head cover rolls up to cover said seat shield for packing said seat shield in roll form which is secured in place by fastening said hook fastener with said loop fastener.

* * * * *